United States Patent [19]

Hards

[11] Patent Number: 4,616,542
[45] Date of Patent: Oct. 14, 1986

[54] FLYING BUCKSAW APPARATUS

[75] Inventor: John E. Hards, Delta, Canada

[73] Assignee: Brunette Machine Works, Ltd., New Westminster, Canada

[21] Appl. No.: 648,380

[22] Filed: Sep. 7, 1984

[51] Int. Cl.$^4$ ............................................... B27B 5/00
[52] U.S. Cl. ....................................... 83/155; 83/289; 83/294; 83/319
[58] Field of Search ................. 83/37, 318, 319, 155, 83/155.1, 289, 294, 364

[56] References Cited

U.S. PATENT DOCUMENTS

| | | | |
|---|---|---|---|
| 619,520 | 2/1899 | Veilgaard | 83/436 |
| 1,117,078 | 11/1914 | Morgal | 83/318 X |
| 2,163,967 | 6/1939 | Strawn et al. | 83/318 X |
| 3,178,974 | 4/1965 | Roess | 83/318 X |
| 3,808,928 | 5/1974 | Plegat | 83/318 X |
| 3,892,153 | 7/1975 | Kato | 83/294 X |
| 3,919,906 | 11/1975 | Law | 83/319 X |

Primary Examiner—James M. Meister
Attorney, Agent, or Firm—Kolisch, Hartwell & Dickinson

[57] ABSTRACT

An apparatus and method is provided for bucksawing a log while the log is being directed in an endwise, downstream direction along a path of travel. The apparatus includes: (1) a saw for sawing the log; (2) apparatus for displacing the saw into and out of the path of log travel to effect cutting of the log; (3) a clamp for releasably gripping the log; (4) apparatus for reciprocating the saw and the clamp along the path of log travel; and (5) a control including apparatus for causing the saw to be displaced into the path of log travel only when the saw is traveling at the same velocity as the log, apparatus for causing the clamp to grip the log only when the clamp is traveling at the log velocity and for causing the clamp to release the log after a cut has been effected, and apparatus for causing the reciprocating apparatus to accelerate the saw and the clamp in a downstream direction up to the log velocity for sawing the log, and then causing the reciprocating apparatus to index the saw means and the clamp means back in an upstream direction after the clamp has released the cut log. The method aspect of the invention includes the steps of feeding a log to be cut in an endwise, downstream path of travel, accelerating a log clamp and a saw along the path of log travel, clamping the log with the log clamp when the speed of the log, the log clamp and the saw are the same, displacing the saw into the log once the log is clamped to cut the log, retracting the saw once the cut has been completed, unclamping the now-cut log, and indexing the log clamp and the saw back in an upstream direction in preparation for the next cutting operation.

8 Claims, 5 Drawing Figures

FLYING BUCKSAW APPARATUS

BACKGROUND OF THE INVENTION

This invention relates generally to sawmill equipment and more particularly to an apparatus and method for cutting a log into suitable lengths.

One of the first steps in converting a tree into lumber is to first cut the tree into suitable log lengths. It is important that the tree be bucked or cut into lengths that will produce the highest possible value of lumber for that tree. During the bucking procedure it is also desirable that defective or excessively crooked wood be cut out of the tree. Such wood is subsequently sent to a chipper for conversion into chips and later pulped. Cutting decisions made during bucking have traditionally been exercised by a highly skilled operator, but computer systems have been recently developed which scan the log and advise the operator as to the most appropriate lengths.

Two types of bucksaw systems are typically utilized. The simplest system is known as the cutoff saw system. In this system the log travels endwise down a conveyer and the operator activates a so-called length stop when he has decided where a cut should be made. The forward end of the log hits the stop, the conveyer is shut down, and the saw is activated to make the desired cut. The log stop is then retracted, and conveyer travel is resumed. Once the cut log has passed the stop, the stop is re-extended, causing the leading end of the remaining part of the tree to run into the stop, and the process is repeated.

The cutoff saw system gives the operator a great amount of versatility because he can cut the log at any point by merely stopping the log on the conveyer, and can reject wood to the chipper by cutting out undesirable sections. However, due to the intermittent nature of the cutoff saw system, it is very slow, resulting in poor productivity. Bucksaw productivity is extremely important because a bottleneck will usually exist in the sawmill at the bucksaw.

A second type of bucksaw which is more commonly used is the slasher deck system. This system is more elaborate than the cutoff saw system and has far greater capabilities. In this system trees are conveyed laterally on lug transfer chains which pass under a series of saws spaced at predetermined increments. Using special log loaders, the operator loads individual trees onto each log space of a continuously moving transfer deck. As each tree is moving toward the saws, the operator is positioning the saws as desired to make the necessary cuts. When the tree reaches the saws, the saws are displaced into the tree to make all of the required cuts at once.

A slasher deck system is far more productive than a cutoff saw system. However, there are a number of drawbacks with a slasher deck system. The system is very elaborate and is therefore expensive to purchase and maintain. Moreover, despite the complex construction of this type of system, it is very difficult to precisely space the saws so that the cut is made exactly where desired. Often the saws are merely placed at commonly required cut points rather than being specifically positioned for each particular log. This results in crooks and other defects remaining in the logs, which produces lower quality lumber and might even require that a cut log be subsequently passed to a chipper as a result of the failure to identify and remove a defect at an early point in the sawmill cycle.

A slasher deck system also takes up a great deal of space. The sheer size of the system also sometimes permits logs to become crossed as they move across the deck on the chains. To correct such faulty positioning, the operator must pry the logs back into a correct position. This can at times be a very dangerous procedure both to the equipment and to personnel.

It is therefore an object of the present invention to provide a bucksaw apparatus and method which overcomes the drawbacks and limitations of the prior proposals. More specifically, the invention has as its objects the following:

(1) to provide a bucking system which gives the operator as much control as possible to cut logs of different lengths while removing defects and damaged portions;

(2) to develop a bucking system which is physically small, simple in construction, and low in initial and operating costs;

(3) the provision of a bucksaw system which may be continuously operated to reduce or eliminate the bottleneck present in existing systems at this point in the system; and (4) the development of a bucksaw which can be substituted for existing cutoff and slasher deck systems without disrupting or requiring replacement of the remaining portions of the production line.

SUMMARY OF THE INVENTION

The present invention accomplishes the above objects by providing an apparatus for bucksawing a log while the log is being directed in a downstream direction along a path of travel. The apparatus includes: saw means for sawing the log; means for displacing the saw means into and out of the path of log travel to effect cutting of the log; clamp means for releasably gripping the log; means for reciprocating the saw means and the clamp means along the path of log travel; and control means including means for causing the saw means to be displaced into the path of log travel only when the saw means is traveling at the same velocity as the log, means for causing the clamp means to grip the log only when the clamp means is traveling at the log velocity and for causing the clamp means to release the log after a cut has been effected, and means for causing the reciprocating means to accelerate the saw means and the clamp means in a downstream direction up to the log velocity for sawing the log, and then causing the reciprocating means to index the saw means and the clamp means back in an upstream direction after the clamp means has released the cut log.

The method aspect of the invention provides a method of bucksawing a log while the log is traveling. The method includes the following steps: feeding a log to be cut in an endwise, downstream path of travel; accelerating log clamp means and saw means along the path of log travel; clamping the log with the log clamp means when the speed of the log, the log clamp means and the saw means are the same; displacing the saw means into the log once the log is clamped to cut the log; retracting the saw means once the cut has been complete; unclamping the now-cut log; and indexing the log clamp means and the saw means back to their original positions.

These and other objects, features, and advantages of the present invention will become evident as this description continues and when reference is made to the accompanying drawings.

BRIEF DESCRIPTION OF THE DRAWINGS

FIG. 1 is a side elevation, partially broken away view of a first embodiment of the present invention, showing the saw carriage in its home, upstream-most position;

FIG. 2 is a top plan view of the embodiment of FIG. 1;

DETAILED DESCRIPTION OF THE PREFERRED EMBODIMENT

Figure 3:
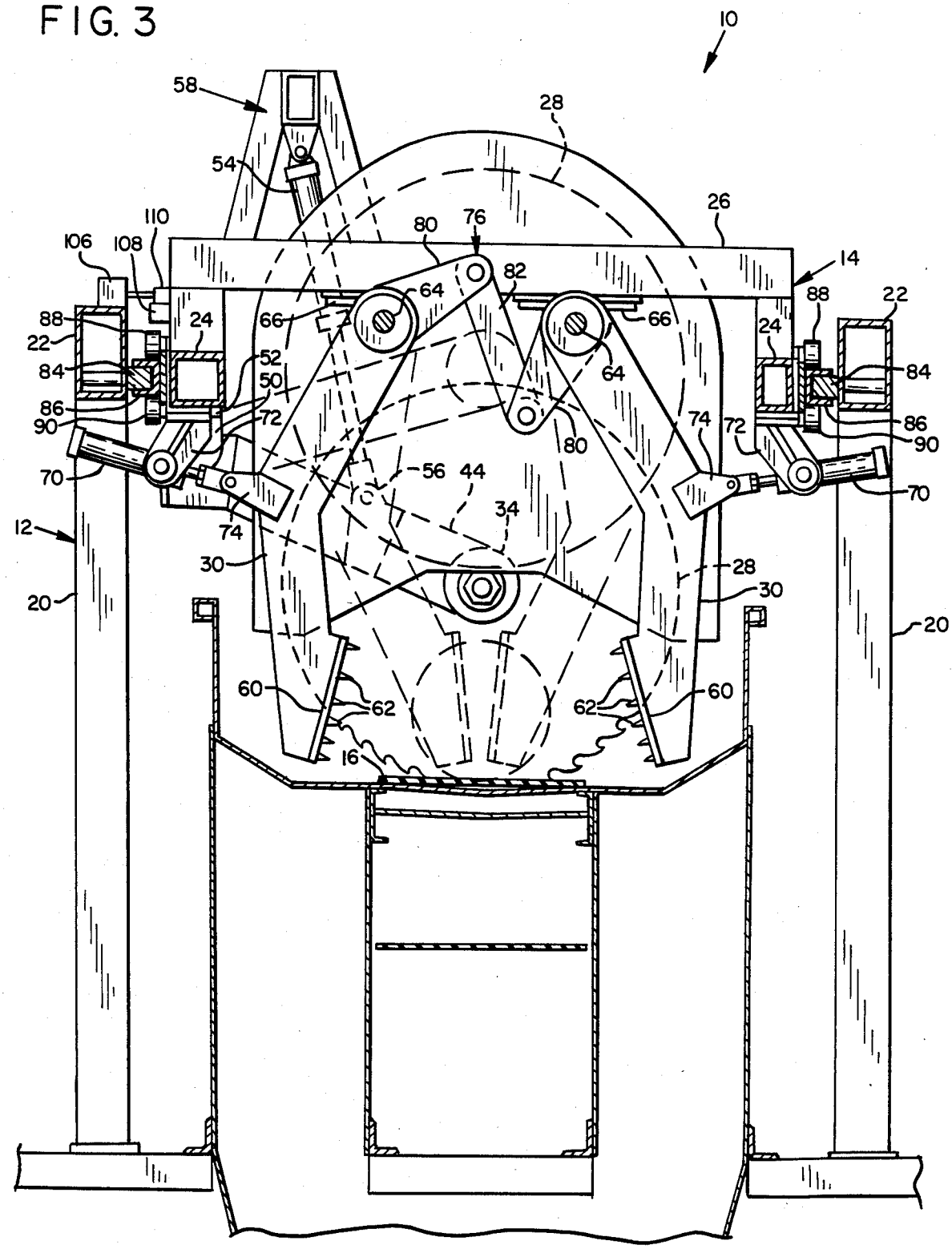
FIG. 3 is an endwise sectional view taken along line 3—3 of FIG. 1, showing the saw blade and the log clamps in retracted and extended positions.
Figure 4:
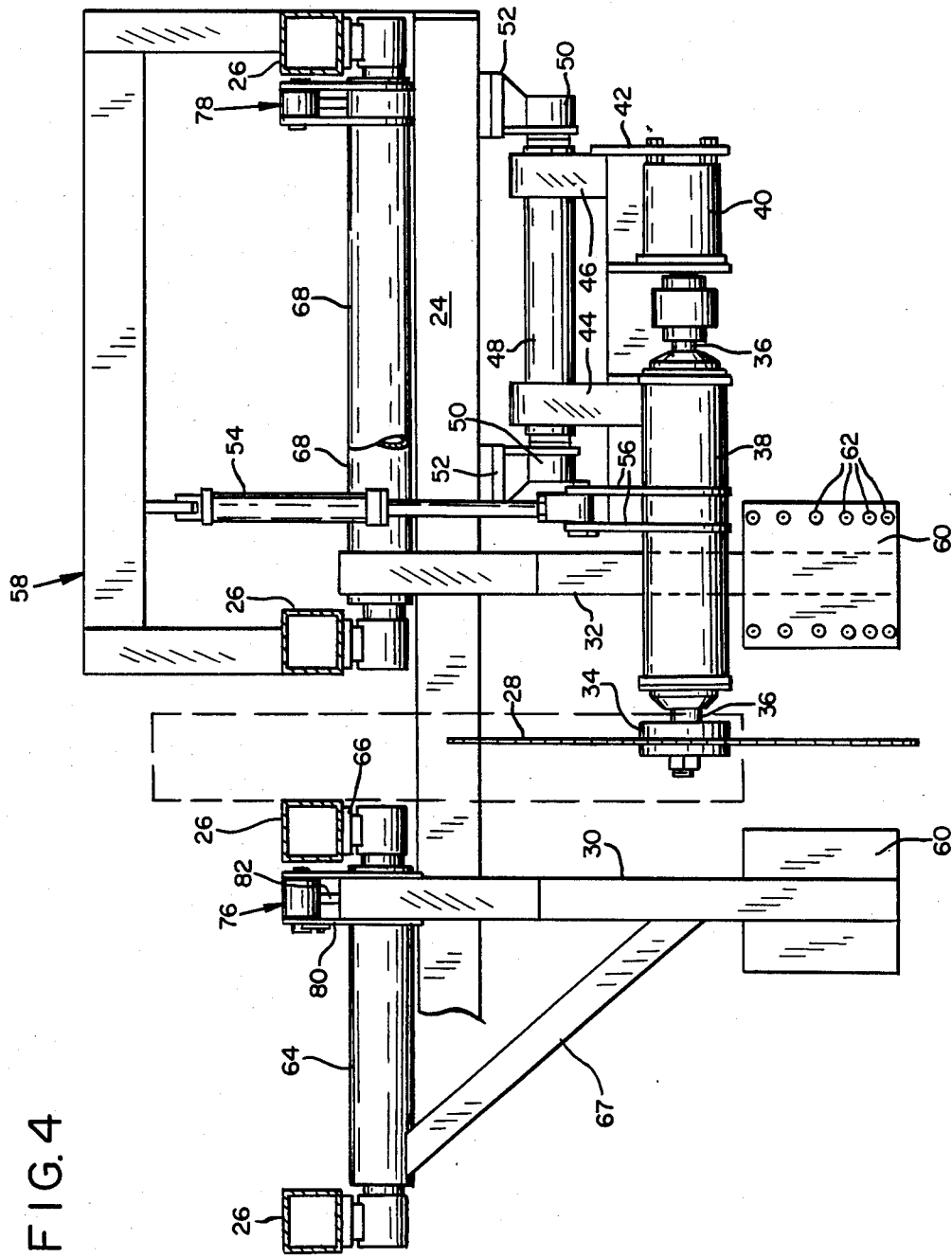
FIG. 4 is a fragmentary side elevational view of the first embodiment.

One form which the flying bucksaw apparatus may take is shown in the figures and identified generally with the numeral 10. The major components of apparatus 10 are a frame 12, a saw carriage 14, an infeed belt conveyer 16, and an outfeed belt conveyer 18. The conveyers 16 and 18 are adapted to convey logs to and from a bucksawing station in apparatus 10. Saw carriage 14 is designed to reciprocate in an endwise direction along the path of travel of the logs so that the logs can be cut while they are "flying" through the apparatus.

Frame 12 includes a plurality of vertically extending, spaced columns 20, and a pair of longitudinally extending frame members 22. In the depicted embodiment, saw carriage 14 has two longitudinally extending carriage members 24, and four transversely extending carriage members 26. Mounted to saw carriage 14 are a saw blade 28 and two pair of log clamps 30 and 32. Saw blade 28 is fixed by a keyed saw blade mount 34 to a saw arbor 36 which extends rearwardly (in a downstream direction or toward outfeed conveyer 18) and rotatively through a saw arbor mount 38 to a saw motor 40 which is carried in a saw motor frame 42. A pair of saw arms 44 and 46 extend transversely from arbor mount 38 and saw motor frame 42 to the side of the apparatus where they are mounted to a longitudinally extending saw arm mounting shaft 48. The saw arm mounting shaft is journaled between a pair of bearings 50 which are mounted to longitudinally extending carriage members 24 by a pair of shaft mounting brackets 52.

The position of saw blade 28 is controlled by a saw positioning hydraulic cylinder 54 which extends from a bracket 56 leading upwardly from saw arbor mount 38 to a saw positioning structure 58 which is mounted above two of the transversely extending carriage members 26. Saw positioning structure 58 is disposed well above the carriage members to provide saw positioning cylinder 54 with a sufficient amount of room to operate. The hydraulic lines which would extend from saw positioning cylinder 54 and the other hydraulic cylinders to be described below, have been deleted from the figures for simplification purposes.

In its raised position, depicted in phantom in FIG. 3, saw blade 28 is concealed within a stationary saw guard 33. Saw guard 33 is shown only in FIG. 3 and has been deleted from the other figures for simplification purposes.

As mentioned above, two pair of log clamps 30 and 32 are mounted to saw carriage 14 to clamp the logs which are to be cut. Log clamps 30 and 32 are of identical construction with clamps 30 being mounted forwardly (toward the upstream end of the apparatus) of saw blade 28, and log clamps 32 being mounted rearwardly of the saw blade. The lower end of each log clamp 30 and 32 terminates in a log gripping plate 60 having a plurality of teeth 62 extending therefrom.

Log clamps 30 and 32 are, in the depicted embodiment, independently mounted to carriage 14. Each forward log clamp 30 extends upwardly to an independent forward log clamp mounting shaft 64, each such shaft being mounted between the underside of two of the transversely extending carriage members 26 by bearings which do not show in the figures but which extend from bearing pads 66 shown in FIG. 3. An obliquely mounted log clamp support arm 67 extends upwardly from each forward log clamp 30 to the forward portion of each forward log clamp mounting shaft 64 to provide additional support.

Each of the rearward log clamps 32 is mounted to carriage 14 by an independent rearward log clamp mounting shaft 68 which extends longitudinally between two of the transversely extending carriage members 26 and is journaled to the underside of such members in a manner similar to forward log clamp mounting shaft 64.

A log clamp hydraulic cylinder 70 controls the position of each log clamp 30 and 32. As shown in FIG. 3, each log clamp cylinder 70 is mounted to the underside of a longitudinally extended carriage member 24 by a log clamp cylinder bracket 72, and is mounted to each log clamp by a log clamp bracket 74. Appropriate pivot joints are provided at such mountings to permit pivoting to occur as log clamp hydraulic cylinders 70 move log clamps 30 and 32 inwardly and outwardly.

To ensure that the position of each of the log clamps 30 and 32 corresponds to that of the other log clamp of its pair, centering means 76 and 78 are mounted between the two forward log clamp mounting shafts 64 and between the two rearward log clamp mounting shafts 68. The two centering means 76 and 78 are identical in construction, with the forward means 76 being shown in FIG. 3. A link arm 80 is rigidly mounted to each forward log clamp mounting shaft 64, and extends to each end of a central arm 82 so that the movement of each forward log clamp 30 will result in corresponding movement of the other forward log clamp. Rearward self centering means 78 performs the same function in the same manner as means 76.

Figures 1, 2:
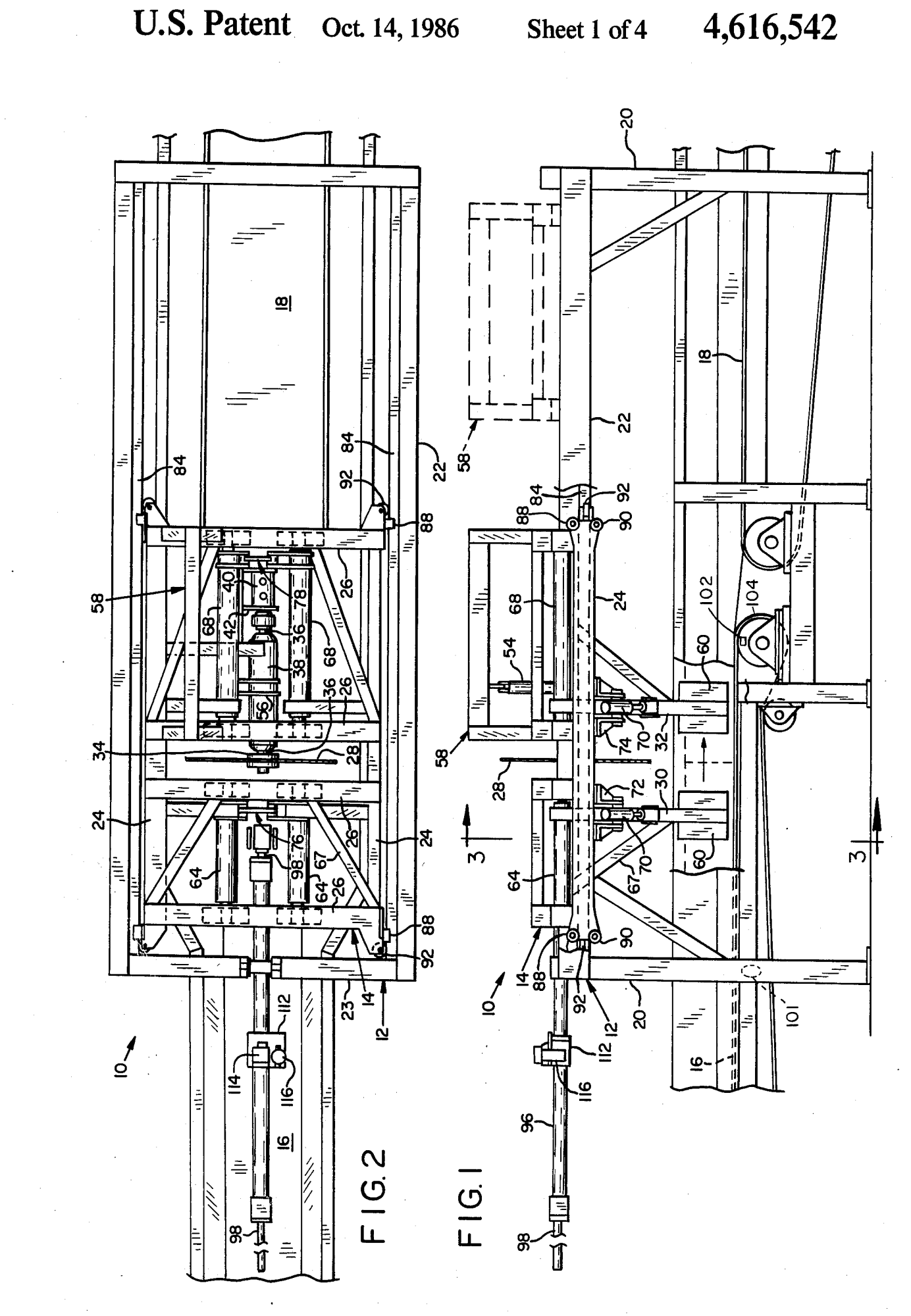

One of the longitudinally extending frame members 22 is partially broken away in FIG. 1 to show the means by which saw carriage 14 is mounted to that frame member. This mounting is shown in section in FIG. 3. Each longitudinally extending frame member 22 includes an inwardly extending channel member 84 so that each frame member 22 is in effect L-shaped in cross section. A replaceable U-shaped runway 86 is mounted to each channel member 84 to provide a surface to which upper rollers 88, lower rollers 90, and end rollers 92 are mounted. Each roller 88, 90, and 92 includes a bearing which is affixed to one of the longitudinally extending carriage members 24. The upper rollers 88 support the weight of carriage 14 while the lower rollers 90 absorb the upward forces generated during sawing operations. The end rollers 92 absorb any transverse forces.

The travel of saw carriage 14 along frame 12 is controlled by a carriage travel hydraulic cylinder 96 which is rigidly mounted to transversely extending frame members 23. Cylinder 96 has a rod 98, the rearward end of which is mounted to carriage 14 at a rod/carriage mount 100, shown in FIG. 2. FIG. 2 shows saw carriage 14 in its forward-most position, so the rearward end of rod 98 is shown fully retracted into carriage travel cylinder 96. With saw carriage 14 in its rearward-most position shown in phantom in FIG. 1, the forward end of rod 98 would be positioned adjacent the forward end of carriage travel cylinder 96.

The controls for the operation of bucksaw apparatus 10 include means for determining where a log is on infeed belt conveyer 16, for sensing the position of saw carriage 14, and for interconnecting this input data and correlating it with information regarding the length of logs desired, as well as data relating to the particular characteristics of the logs feeding into the apparatus. The infeed sensing means includes a photo electric eye which, is shown in FIG. 1, may be mounted to the forward most column 20, and is positioned to direct a beam of light across the apparatus immediately above infeed belt conveyer 16. A first encoder 102 is mounted to one of the drums 104 to which infeed belt conveyers 16 is mounted. This encoder measures the number of revolutions of drum 104 once photo eye 101 senses the leading end of the log. Thus, first encoder 102 permits the travel of the log through apparatus 10 toward saw blade 28 to be measured. One encoder which is suitable for this use is marketed by B.E.I. Electronics, Inc., of Santa Barbara, Calif., under the designation Type H25 Incremental Optical Encoder.

Means are also provided for determining the position, direction and velocity of travel of saw carriage 14 along frame 12. As shown in FIG. 3, a second encoder 106 is provided along with a rack and pinion structure to measure relative travel between the carriage and the frame. A rack gear 108 is mounted to one side of saw carriage 14, and a pinion gear 110 is rotatably mounted to encoder 106, and meshes with rack gear 108. An encoder which has been found suitable for this purpose is also marketed by B.E.I. Electronics, Inc., under the designation Series MT-40 Absolute Position Multi-Term Encoder.

FIGS. 1 and 2 schematically depict the hydraulic controls for apparatus 10. A servo valve manifold 112 is shown, which mounts a servo valve 114 and a supplemental flow valve 116. These hydraulic components control the flow of hydraulic fluid into carriage travel hydraulic cylinder 96 and thereby control the relative position of saw carriage 14 on frame 12.

Figure 5:
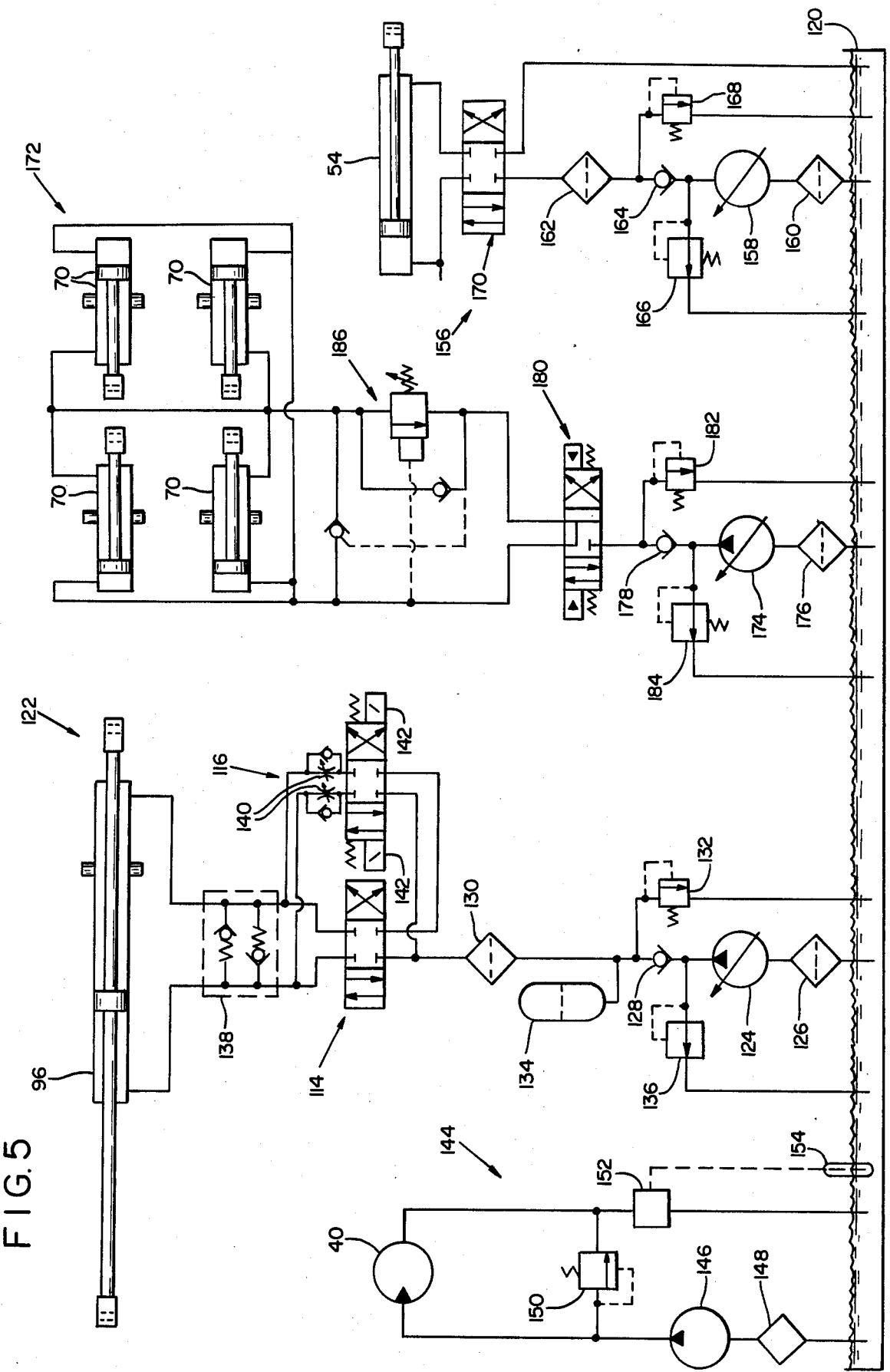
FIG. 5 is a somewhat simplified, schematic diagram of the preferred hydraulic system used with the depicted embodiment.

The hydraulic control system for apparatus 10 is depicted in more detail in FIG. 5 where the hydraulic controls for carriage travel hydraulic cylinder 96, saw motor 40, saw position hydraulic cylinder 54, and log clamp hydraulic cylinders 70, are shown. A common hydraulic reservoir 120 is provided for the hydraulic system. This system is of conventional design, so FIG. 5 is somewhat simplified and will only be briefly described.

The hydraulic system for carriage travel hydraulic cylinder 96 has been generally indicated with the numeral 122. This system includes a hydraulic pump 124 which draws fluid from reservoir 120 via an intake filter 126, and discharges that fluid through a check valve 128 and a discharge filter 130 to the previously identified servo valve 114. It is actually preferred that two hydraulic pumps be provided, but only one has been depicted for purposes of simplification. Hydraulic pump 124 is typically designed to provide approximately 41 GPM at 175 RPM, so that with two such pumps, a total system volume of 82.2 GPM is provided. Pressure in system 122 is typically somewhat less than 2,500 psi.

A relief valve 132 is mounted immediately downstream of check valve 128, to relieve excess pressure back to reservoir 120. An air charging cylinder 134 provides an air charge of approximately 2000 psi. Also provided is an air bleed valve 136 to bleed air from the system. A dual relief valve 138 is mounted between servo valve 114 and carriage travel hydraulic cylinder 96 to relieve excess pressure in either side of that cylinder.

Servo valve 114 and supplemental flow valve 116 cooperate to provide excess hydraulic fluid during the acceleration cycles of carriage travel hydraulic cylinder 96. During such acceleration period, servo valve 114 will be fully opened, and excess fluid will be permitted to pass through either of a pair of variable orifices 140 so that the servo valve does not have to be of such size that the speed of the system will be adversely affected. Both servo valve 114 and supplemental flow valve 116 are solenoid operated, with supplemental flow valve 116 being spring-centered to a neutral position, but with the capacity of being offset by one of two solenoids 142 during high speed operation of the system. During normal ramping of hydraulic system 122, the flowthrough valve 116 may be added or deleted depending upon the quantity of hydraulic fluid to be passing to carriage travel hydraulic cylinder 96. During periods of minimal flow, valve 116 will be entirely closed and servo valve 114 will be ramped down to an appropriate setting. Rapid acceleration of the system is permitted by the extra flow capability being provided by valve 116.

The hydraulic system for saw motor 40 is generally depicted with the number 144. It also draws fluid from and discharges fluid to reservoir 120. A hydraulic pump 146 draws fluid via an intake filter 148 and directs fluid to motor 40. Hydraulic pump 146 typically provides approximately 58 GPM at 1,750 RPM and normally has a system pressure of somewhat less than 1,500 psi. A relief valve 150 controls the pressure in this line, while an oil cooler 152 controls the temperature of the oil. A thermostat 154 senses the temperature in reservoir 120 so that an intermittently operated fan associated with oil cooler 152 can control the temperature of the oil.

The hydraulic system for saw positioning hydraulic cylinder 54 is identified generally with the numeral 156. this system includes a hydraulic pump 158, with intake and discharge filters 160 and 162, a check valve 164, an air bleed valve 166, a relief valve 168, and a solenoid activated servo valve 170. Hydraulic pump 158 typically discharges approximately 33 GPM at 1,750 RPM, with a system pressure of less than 1,500 psi.

The hydraulic system for log clamp hydraulic cylinders 70 is indicated generally with the numeral 172. In system 172, a hydraulic pump 174 draws fluid from reservoir 120 via an intake filter 176, and discharges that fluid via a check valve 178 to a three-position, spring-centered, solenoid activated servo valve 180. Also provided are a relief valve 182 and an air bleed valve 184. In order to short-circuit servo valve 180 during periods of high speed displacement of cylinders 70, a regeneration valve 186 recirculates the oil to short-circuit the servo valve and thereby increases the speed capability of the system without requiring a larger hydraulic pump. Hydraulic pump 174 normally discharges 32.5

GPM at 1,750 RPM, with a system pressure approximating 1,000 psi.

OPERATIONAL DESCRIPTION

The operation of the depicted embodiment will now be described. The operation begins with the log being conveyed into apparatus 10 by infeed belt conveyor 16. The conveyor speed is generally between about 50 to 220 feet per minute and normally bears a direct relationship to the speed of the barker outfeed system disposed downstream of the apparatus. At this point, saw carriage 14 is disposed on frame 12 in its upstream-most position, depicted in phantom in FIG. 2. When the leading edge of the log breaks the beam of photoeye 101, the first encoder 102 mounted to drum 104 begins measuring off the predetermined log length to be cut. This predetermined length can be widely adjustable, but typically is between 8 and 20 feet with increments normally of about 2 feet. The apparatus may also be used to cut off damaged log ends. The cutting length may be selected manually or through the use of a log scanner.

As the log is traveling along infeed belt conveyor 16, first encoder 102 is counting off its travel. Prior to the time that the cutting line reaches saw blade 28, saw carriage 14 begins its downstream travel along saw carriage 14. This is done by energizing hydraulic servo valve 114 to accelerate the speed of saw carriage 14 up to the speed at which the log is traveling.

As the log and saw carriage 14 are traveling in a downstream direction, second encoder 106 is measuring the speed and location of saw carriage 14 with respect to frame 12 and the log. Once the two encoders 102 and 106 determine that the speed of saw carriage 14 has reached the exact speed of the log, a time delay of approximately 50-milliseconds is provided for the hydraulic and electrical signals to stabilize and to ensure that the velocities match within ±0.5%. Once the velocities of saw carriage 14 and the log are matched, saw blade 28 will be positioned at exactly the spot where it is to make its cut. When the lag period has passed, the two pairs of log clamps 30 and 32 are energized to close and thereby clamp the log. During this clamping process, forward and rearward selfcentering means 76 and 78 ensure that each clamp of the two pairs of clamps are moving toward the log at the same rate so that the log will not be displaced from its center position on infeed belt conveyor 16. The closing of log clamps 30 and 32 actually may be initiated at or about the time that saw carriage 14 begins its downstream travel because some distance is covered by the clamps before they actually come into contact with the log.

Once the log is securely held by log clamps 30 and 32, saw-positioning hydraulic cylinder 54 is activated to extend saw blade 28 downwardly into the log. Saw motor 40 would previously have been activated prior to introduction of the log into the infeed belt conveyor, so automatic switching means need not be provided for the saw motor.

During the period that cutting is taking place, both the log and saw carriage 14 are traveling through apparatus 10, so that the cutting operation is not required that the travel of the log be interrupted in any way. This provides a capability not present in any prior art bucksaw.

Saw blade 28 will complete its cutting path through the log downstream of the downstream end of infeed belt conveyor 16, either in a gap 118 (see FIG. 1) disposed between the infeed belt conveyor and outfeed belt conveyor 18, or when the log is suspended above the outfeed belt conveyor 18. Because outfeed belt conveyor 18 is lower than infeed belt conveyor 16, and during the cutting operation log clamps 30 and 32 are holding the log at the level of the infeed belt conveyor, saw blade 28 can extend below the log during the completion of cutting, but will not contact or damage the outfeed belt conveyor. This is a desirable feature because the extent of travel of saw blade 28 need not be precisely controlled to avoid damage to the belt. As mentioned above, in some applications the cutting operation will be completed with saw blade 28 disposed above gap 118. This is advantageous when merely an end of the log is being cut off, so that the end may drop through the gap and need not travel along outfeed belt conveyor 18. The position of saw blade 28 at the end of the cutting operation can be predetermined by varying the point at which saw carriage 14 begins its downstream travel.

Once the cut is completed, saw positioning hydraulic cylinder 54 is retracted to return saw blade 28 to its initial position. This is accomplished as soon as possible, although the hydraulic servo valve (not shown) for the positioning cylinder is ramped down to decelerate its travel as the return stroke is being completed. Proximity switches may be mounted on the saw arms 44 and 46 to indicate the fully extended and fully retracted positions. Saw arms 44 and 46 will also typically be provided with externally mounted shock absorbers (not shown) for the return stroke.

At a predetermined time, normally when saw blade 28 clears the maximum diameter log, log clamps 30 and 32 are retracted to drop the now-cut log onto outfeed belt conveyor 18. Once the log is dropped, saw carriage 14 is decelerated down by servo valve 114. Once this is done, supplemental flow valve 116 is switched and the servo valve is reactivated to cause carriage travel hydraulic cylinder 96 to return saw carriage 14 to its initial upstream position. This return or indexing operation is as fast as possible to reduce the overall cycling time, but the indexing speed is normally ramped up and down to ensure safety. Externally mounted shock absorbers (not shown) are normally also provided, but would not come into play unless saw carriage 14 over-travels or malfunctions.

While saw carriage 14 is indexing to its home position, the next log to be cut is already traveling down the conveyor, or, if a next length is to be cut in the same log which previously has been cut, that log is still disposed on the infeed belt conveyor. Depending upon conveyor speed and the length measurement that has been chosen, saw carriage 14 will either immediately begin its next cycle (for an 8-foot cut) or it will wait until first encoder 102 has determined the correct time.

An additional advantage of the invention is that saw carriage 14 need not be returned entirely to its home position in order to start the next cycle. This is an advantage when cutting 8-foot pieces. That is, when the saw completes its first cut, the return stroke needs only to index the saw past the point where the next cut should be made. Saw carriage 14 is then reversed and when the saw is positioned at the appropriate point and the velocities are matched, the next cut is begun. If saw carriage 14 is not at a stop position at the time that saw carriage travel should begin, infeed belt 16 could be slowed or stopped. When saw carriage 14 is fully indexed, the cycle would then begin.

While apparatus 10 is operating, if a condition arises in which a cut must be aborted or saw blade 28 must be stopped from making its automatically timed cut, the cycle can be stopped and control placed into a manual operation mode. The log length sequence can at this time be canceled and the log would be manually cut for its remaining length. Upon completion of all the required cuts to that log, the machine can be returned to the automatic mode and continue as before.

If apparatus 10 is in an abort mode with the sequence of automatic operations terminated, and saw carriage 14 reaches its downstream-most position before log clamps 30 and 32 have released the cut log, both conveyors and saw carriage 14 are stopped. Log clamps 30 and 32 are then manually released, and outfeed belt conveyor 18 is activated to carry the cut log away. Infeed belt conveyor 16 is not reactivated until saw carriage 14 is indexed to its home position, at which point apparatus 10 can be shifted back to its automatic mode.

In the event the cycle does not complete for any reason, such as jamming of saw blade 28, or the saw blade does not fully return to its retracted position, both belt conveyors and the saw carriage are shifted to a stop mode until the operator manually corrects the problem and completes the cutting operation or returns the saw carriage to its home position. During the abort mode, to prevent damage to saw blade 28, infeed and outfeed belt conveyors 16 and 18 and saw carriage 14 are decelerated at the same rate. To permit this, the infeed and outfeed conveyors should be of variable speed. This would also allow suitable manual operation and reduced speed automatic operation where a series of 8-foot length cuts are being made. Conveyor speed may be increased with longer length cuts.

Interlocks are normally provided so that all functions are running and ready before the unit will attempt to operate in the automatic mode. If any motor in the system cuts out, apparatus 10 automatically stops. An electrical interlock is provided to ensure that saw blade 28 will not cut down all the way through the log until the log has passed downstream of infeed belt conveyor 16 and is at least disposed above gap 118 if not above outfeed belt conveyor 18. This prevents damage to infeed belt conveyor 16 as described above. Instead of plurality of encoders used with apparatus 10, it may be possible to include a plurality of photoeyes which sense the travel of the log through the apparatus. It is anticipated that this variation will be covered by and made a part of this application.

These and other changes and modifications to the preferred embodiment described herein will be apparent to those skilled in the art. Such changes and modifications can be made without departing from the spirit of the present invention and without diminishing its attendant advantages. It is, therefore, intended that such changes and modifications be covered by the following claims.

It is claimed and desired to secure by letters patent:

1. Apparatus for bucksawing a log along a predetermined cutting line while the log is being directed in an endwise, downstream direction along a substantially horizontal path of travel, comprising:
    saw means for sawing the log, said saw means being initially disposed above said path of log travel;
    means for displacing said saw means downwardly into and upwardly out of said path of log travel to effect cutting of the log;
    clamp means for releasably gripping the log;
    means for reciprocating said saw means and said clamp means along said path of log travel;
    control means including means for causing said saw means to be displaced into said path of log travel only when said saw means is traveling at the same velocity as the log, means for causing said clamp means to grip the log only when said clamp means is traveling at said log velocity and for causing said clamp means to release the log after a cut has been effected along the cutting line, and means for causing said reciprocating means to accelerate said saw means and said clamp means in a downstream direction up to said log velocity for sawing the log, and then causing said reciprocating means to index said saw means and said clamp means back in an upstream direction after said clamp means has released the cut log;
    substantially horizontal log infeed support means for supporting the log from below and for conveying the log along said path of log travel at a first height;
    log outfeed support means for supporting the log from below after it has been cut and for conveying the cut log along said path of log travel at a height which is lower than said first height; and
    wherein said clamp means includes means for supporting the log such that a space is defined below the log during at least a portion of the path of log travel, said space extending in a downstream direction from the cutting line, and wherein said control means includes means for causing said saw means to complete cutting of the log when the cutting line is supported over said space.

2. The apparatus of claim 1, wherein said clamp means includes means for supporting the cut log such that it is unsupported from below.

3. Apparatus for bucksawing a log along a predetermined cutting line while the log is being directed in an endwise, downstream direction along a substantially horizontal path of travel, comprising:
    saw means for sawing the log, said saw means being initially disposed above said path of log travel;
    means for displacing said saw means downwardly into and upwardly out of said path of log travel to effect cutting of the log;
    clamp means for releasably gripping the log;
    means for reciprocating said saw means and said clamp means along said path of log travel;
    control means including means for causing said saw means to be displaced into said path of log travel only when said saw means is traveling at the same velocity as the log, means for causing said clamp means to grip the log only when said clamp means is traveling at said log velocity and for causing said clamp means to release the log after a cut has been effected along the cutting line, and means for causing said reciprocating means to accelerate said saw means and said clamp means in a downstream direction up to said log velocity for sawing the log, and then causing said reciprocating means to index said saw means and said clamp means back in an upstream direction after said clamp means has released the cut log;
    substantially horizontal log infeed support means for supporting the log from below and for conveying the log along said path of log travel at a first height;
    wherein said clamp means includes means for supporting the log such that a space is defined below the log during at least a portion of the path of log travel, said space extending in a downstream direction from the cutting line, and wherein said control means includes means for causing said saw means to complete cutting of the log when the cutting line is supported over said space;

means for controlling the point along the path of log travel that the cut is completed; and log outfeed support means for conveying the log along said path of log travel at a second, lower height, and wherein an opening is defined along said path of log travel between said log infeed and outfeed support means, and wherein said means for controlling the point of completion of the cut includes means for completing the cut over said opening.

4. Apparatus for bucksawing a log along a predetermined cutting line while the log is being directed in an endwise, downstream direction along a substantially horizontal path of travel, comprising:

saw means for sawing the log, said saw means being initially disposed above said path of log travel;

means for displacing said saw means downwardly into and upwardly out of said path of log travel to effect cutting of the log;

clamp means for releasably gripping the log;

means for reciprocating said saw means and said clamp means along said path of log travel;

control means including means for causing said saw means to be displaced into said path of log travel only when said saw means is traveling at the same velocity as the log, means for causing said clamp means to grip the log only when said clamp means is traveling at said log velocity and for causing said clamp means to release the log after a cut has been effected along the cutting line, and means for causing said reciprocating means to accelerate said saw means and said clamp means in a downstream direction up to said log velocity for sawing the log, and then causing said reciprocating means to index said saw means and said clamp means back in an upstream direction after said clamp means has released the cut log;

substantially horizontal log infeed support means for supporting the log from below and for conveying the log along said path of log travel at a first height;

wherein said clamp means includes means for supporting the log such that a space is defined below the log during at least a portion of the path of log travel, said space extending in a downstream direction from the cutting line, and wherein said control means includes means for causing said saw means to complete cutting of the log when the cutting line is supported over said space;

means for controlling the point along the path of log travel that the cut is completed; and means for conveying the cut log along said path of log travel at a second, lower height, wherein said clamp means includes means for conveying the log cutting line to a point above said log outfeed support means, and wherein said means for controlling the point of completion of the cut includes means for completing the cut when the cutting line is over said means for conveying the cut log at a second height.

5. Apparatus for bucksawing a log along a predetermined cutting line while the log is being directed in an endwise, downstream direction along a substantially horizontal path of travel, comprising:

saw means for sawing the log;

means for displacing said saw means into and out of said path of log travel to effect cutting of the log;

means for releasably engaging and conveying the log along said path of log travel at a first height, said engagement and conveying means including means for conveying the log along said path of log travel such that the log is unsupported from below at the cutting line during at least a portion of the operating cycle;

said engagement and conveying means further including two pair of clamps, one pair being disposed to each side of said saw means along said path of the log travel an infeed log support means disposed at a first height, and outfeed log support means disposed at a second height;

means for conveying said saw means in a path of travel substantially parallel to said path of log travel, at the same velocity as the log travel velocity during at least part of a bucksawing cycle; and control means for causing said saw means to be displaced into said path of log travel when said saw means is traveling at the same velocity as the log, said control means including means for controlling the point along the path of log travel that the cut is completed.

6. The apparatus of claim 5, wherein said clamps include means for supporting the cut log such that it is unsupported from below.

7. The apparatus of claim 5, wherein an opening is defined between said infeed and outfeed support means along said path of log travel, and wherein said means for controlling the point of completion of the cut includes means for completing the cut over said opening.

8. Apparatus for bucksawing a log along a predetermined cutting line while the log is being directed in an endwise, downstream direction along a substantially horizontal path of travel, comprising:

saw means for sawing the log;

means for displacing said saw means into and out of said path of log travel to effect cutting of the log;

means for releasably engaging and conveying the log along said path of log travel at a first height, said engagement and conveying means including means for conveying the log along said path of log travel such that the log is unsupported from below at the cutting line during at least a portion of the operating cycle;

means for conveying said saw means in a path of travel substantially parallel to said path of log travel, at the same velocity as the log travel velocity during at least part of a bucksawing cycle;

control means for causing said saw means to be displaced into said path of log travel when said saw means is traveling at the same velocity as the log, said control means including means for controlling the point along the path of log travel that the cut is completed; and means for conveying the cut log along said path of log travel at a second, lower height, wherein said means for releasably engaging and conveying the log includes means for conveying the log cutting line to a point above said means for conveying the cut log, and wherein said means for controlling the point of completion of the cut includes means for completing the cut when the cutting line is over said means for conveying the cut log.

* * * * *